United States Patent
Hoshida et al.

(10) Patent No.: US 7,110,680 B2
(45) Date of Patent: Sep. 19, 2006

(54) METHOD AND SYSTEM FOR FORWARD PUMPING RAMAN AMPLIFICATION IN AN OPTICAL NETWORK

(75) Inventors: Takeshi Hoshida, Richardson, TX (US); Seemant Choudhary, Irving, TX (US)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 10/194,016

(22) Filed: Jul. 12, 2002

(65) Prior Publication Data

US 2004/0212871 A1    Oct. 28, 2004

(51) Int. Cl.
*H04B 10/02*   (2006.01)

(52) U.S. Cl. .................. 398/181; 398/192; 398/193

(58) Field of Classification Search ................ 398/181, 398/192, 193, 199, 160, 79
See application file for complete search history.

(56) References Cited

U.S. PATENT DOCUMENTS

| | | | |
|---|---|---|---|
| 5,991,070 A | 11/1999 | Zanoni et al. | 359/341 |
| 6,246,515 B1 | 6/2001 | Cereo et al. | 359/345 |
| 6,356,383 B1 | 3/2002 | Cornwell, Jr. et al. | 359/334 |
| 6,384,963 B1 | 5/2002 | Ackerman et al. | 359/334 |
| 6,850,360 B1 * | 2/2005 | Chen et al. | 359/334 |
| 6,856,768 B1 * | 2/2005 | Gnauck et al. | 398/83 |
| 2001/0015220 A1 | 8/2001 | Papernyl et al. | 359/334 |
| 2001/0036004 A1 | 11/2001 | Ackerman et al. | 359/334 |
| 2002/0063949 A1 | 5/2002 | Cornwall, Jr. et al. | 359/334 |
| 2002/0097481 A1 * | 7/2002 | Du et al. | 359/334 |
| 2003/0016437 A1 * | 1/2003 | Islam et al. | 359/334 |

OTHER PUBLICATIONS

W. Jiang et al., "Crosstalk in Fiber Raman Amplification for WDM Systems," *Journal of Lightwave Technology*, vol. 7, No. 9, pp. 1407-1411, Sep. 1989.
A. Siddiqui, "The Effect of Pump and Signal Laser Fluctuations on the Output Signal from Raman and Brillouin Optical Fiber Amplifiers," *Journal of Optical Communications*, vol. 13, pp. 33-36, Mar. 1992.
Y. Chen et al., "Bi-directionally Pumped Broadband Raman Amplifier," *Technical Digest of ECOC 2001*, TuL3-4, Sep. 2001, 2 pages.
S. Kado et al., "Broadband Flat-noise Raman Amplifier Using Low-noise Bi-directionally Pumping Sources," *Technical Digest of ECOC 2001*, ThF4-10, 2 pages, Sep. 2001.
P.M. Krummrich et al., "System Performance Improvements by Codirectional Raman Pumping of the Transmission Fiber," ECOC 2001, 2 pages, 2001.
V. Dominic et al., "Distributed Raman Amplification with Co-propagating Pump Light," OAA 2001, 3 pages, 2001.
S. Radic et al., "Feasibility of Hybrid Raman/EDFA Amplification in Bidirectional Optical Transmission," *IEEE Photonics Technology Letters*, vol. 14, No. 2, pp. 221-223, Feb. 2002.

* cited by examiner

*Primary Examiner*—David Payne
(74) *Attorney, Agent, or Firm*—Baker Botts L.L.P.

(57) ABSTRACT

An optical communication system includes a plurality of nodes coupled by an optical fiber. The optical fiber comprises a gain medium and is operable to transmit optical signals in a plurality of channels. An optical pump is coupled to the optical fiber, and is operable to generate and transmit an optical pump signal co-propagating with the optical signals. The optical pump signal comprises a specified walk-off with respect to the optical signals and is operable to Raman amplify the signals in the optical fiber while maintaining an eye penalty below 0.5 decibels.

10 Claims, 2 Drawing Sheets

METHOD AND SYSTEM FOR FORWARD PUMPING RAMAN AMPLIFICATION IN AN OPTICAL NETWORK

TECHNICAL FIELD

The present invention relates generally to optical communication systems, and more particularly to a method and system for forward pumping Raman amplification in an optical network.

BACKGROUND

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is increased as a multiple of the number of wavelengths, or channels, in each fiber.

The maximum distance that a signal can be transmitted in a WDM or other optical network without amplification is limited by absorption, scattering and other loss associated with the optical fiber. To transmit signals over long distances, optical networks typically include a number of discrete amplifiers spaced along each fiber route. The discrete amplifiers boost received signals to compensate for transmission losses in the fiber.

Signals may also be boosted in the fiber using Raman effect amplification. In the Raman effect, optical signals traveling in the fiber are amplified by the presence of a lower wavelength pump light traveling in the same fiber. The pump light may travel forward with the signal or backwards in reverse of the signal. Forward pumping amplification, however, suffers from bit pattern dependent pump depletion, resulting in cross talk between channels in WDM systems.

SUMMARY

The present invention provides a method and system for forward pumping Raman amplification in an optical network that reduces or eliminates problems and disadvantages of previous systems and methods. In a particular embodiment, an optical network may be designed, implemented, provisioned, and/or operated with forward pumping Raman amplification by selecting pump wavelengths and transmission channels bands according to the dispersion characteristics of the gain fiber.

In accordance with one embodiment of the present invention, an optical communication system includes a plurality of nodes coupled by an optical fiber. The optical fiber comprises a gain medium and is operable to transmit optical signals in a plurality of channels. An optical pump is coupled to the optical fiber, and is operable to generate and transmit an optical pump signal co-propagating with the optical signals. The optical pump signal comprises a specified walk-off with respect to the optical signals and is operable to Raman amplify the signals in the optical fiber while maintaining an eye penalty below 0.5 decibels.

In accordance with another embodiment of the present invention, an optical communication system includes a plurality of nodes coupled by an optical fiber. The optical fiber comprises a gain medium and is operable to transmit optical signals in a plurality of channels. An optical pump is coupled to the optical fiber, and is operable to generate and transmit an optical pump signal co-propagating with the optical signals. The optical signals have a gain compression level less than one decibel.

In accordance with another embodiment of the present invention, a method for improving signal quality in an optical network employing forward pumping distributed amplification includes determining a bit walk-off for a plurality of optical channels. A first set of optical signals is assigned to a first set of optical channels having the highest bit walk-off relative to the remaining optical channels in the optical network.

In accordance with still another embodiment of the present invention, a method for provisioning an optical network with forward pumping Raman amplification includes selecting at least one of a set of operating parameters including a gain medium, a data signal power, a pump power, a signal wavelength, a pump wavelength, and a symbol rate. The selected parameter is selected based on the remaining parameters to achieve at least one of a walk-off of at least 5 and a gain compression less than one decibel. The network is operated at the operating parameters.

Technical advantages of the present invention include providing an improved method and system for distributed amplification in an optical communication system. In a particular embodiment, forward pumping Raman amplification may be provided with little or minimal signal distortion. As a result, signals may be efficiently transmitted over longer distances, Raman amplification may be used in connection with bi-directional optical transmission systems and bi-directionally-pumped Raman amplification may be used in connection with long-haul and other suitable networks.

Another technical advantage of the present invention includes providing forward pumping Raman amplification with reduced gain modulation and/or small distortion. In a particular embodiment, a forward pumping bit walk-off threshold for any channel wavelength in an optical system may be specified and maintained for the optical system. In addition or alternatively, traffic may be assigned to channels in descending order, beginning with the channel wavelength having the largest forward pumping bit walk-off. Also, symbol period, modulation format and/or characteristics of the fiber may be specified or set to control gain modulation of signals in the fiber. In this way, gain modulation effects typically associated with forward pumping distributed amplification, such as self-gain modulation and cross-gain modulation, are reduced. Accordingly, the eye penalty contributing to signal degradation is also reduced.

Other technical advantages of the present invention will be readily apparent to one skilled in the art from the following figures, description, and claims. Moreover, while specific advantages have been enumerated above, various embodiments may include all, some, or none of the enumerated advantages

BRIEF DESCRIPTION OF THE DRAWINGS

For a more complete understanding of the present invention and its advantages, reference is now made to the following description, taken in conjunction with the accompanying drawings, wherein like numerals represent like parts, in which.

DETAILED DESCRIPTION

Figure 1:
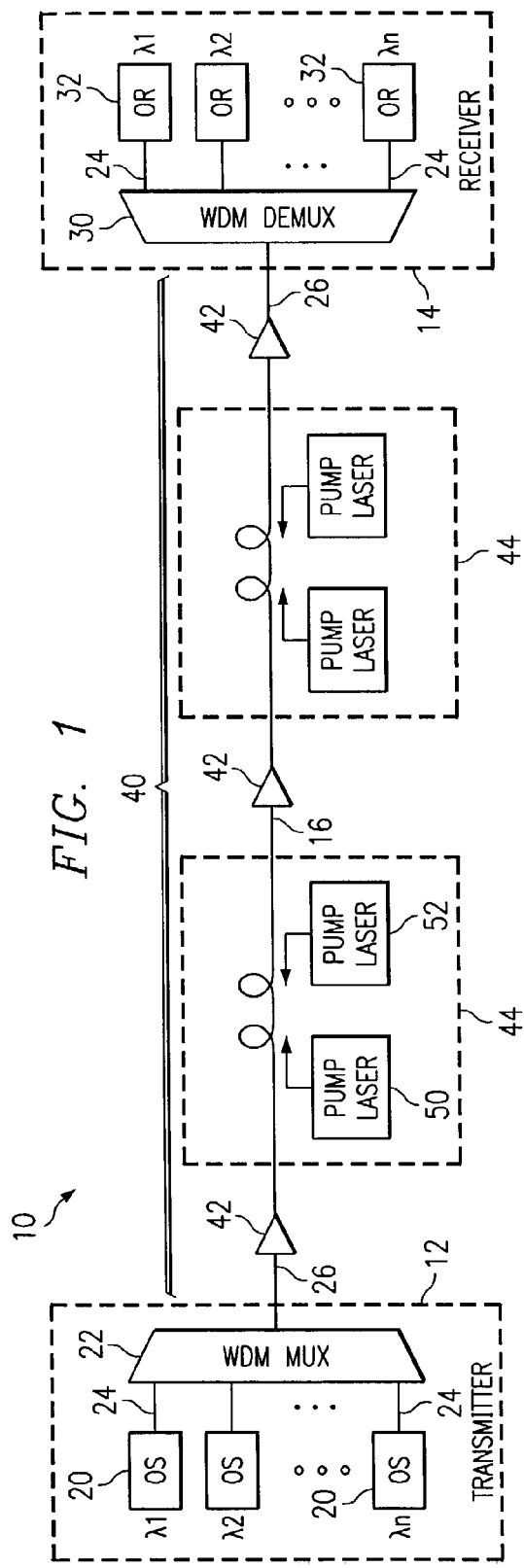
FIG. 1 illustrates an optical communication system using distributed Raman amplification in accordance with one embodiment of the present invention.

FIG. 1 illustrates an optical communication system 10 in accordance with one embodiment of the present invention. In this embodiment, the optical communication system 10 is a wavelength division multiplexed (WDM) system in which a number of optical channels are carried over a common path at disparate wavelengths. It will be understood that the optical communication system 10 may comprise a dense wavelength division multiplexed (DWDM) or other suitable multi-channel or bi-directional transmission systems.

Referring to FIG. 1, the WDM system 10 includes a WDM transmitter 12 at a source end point and a WDM receiver 14 at a destination end point coupled together by an optical fiber, or link 16. The optical fiber may be one or more physical fibers or carriers optically coupled together. The WDM transmitter 12 transmits data in a plurality of optical signals, or channels, over the optical link 16 to the remotely located WDM receiver 14.

The WDM transmitter 12 includes a plurality of optical senders 20 and a WDM multiplexer 22. Each optical sender 20 generates an optical information signal 24 on one of a set of distinct wavelengths $\lambda_1, \lambda_2 \ldots \lambda_n$ at the channel spacing. The optical information signals 24 comprise optical signals with at least one characteristic modulated to encode audio, video, textual, real-time, non-real-time or other suitable data. The optical information signals 24 are multiplexed into a single WDM signal 26 by the WDM multiplexer 22 for transmission on the optical link 16. It will be understood that the optical information signals 24 may be otherwise suitably combined into the WDM signal 26. The WDM signal is transmitted in the synchronous optical network (SONET) or other suitable format.

The WDM receiver 14 receives, separates and decodes the optical information signals 24 to recover the included data. In one embodiment, the WDM receiver 14 includes a WDM demultiplexer 30 and a plurality of optical receivers 32. The WDM demultiplexer 30 demultiplexes the optical information signals 24 from the single WDM signal 26 and sends each optical information signal 24 to a corresponding optical receiver 32. Each optical receiver 32 optically or electrically recovers the encoded data from the corresponding signal 24. As used herein, the term each means every one of at least a subset of the identified items.

The optical link 16 comprises optical fiber or other suitable medium in which optical signals may be transmitted with low loss and Raman amplified during transmission. Interposed along the optical link 16 are one or more optical amplifiers 40. The optical amplifiers 40 increase the strength, or boost, one or more of the optical information signals 24, and thus the WDM signal 26, without the need for optical-to-electrical conversion. One or more dispersion compensating fibers (DCFs) may also be interposed along the optical link 16.

In one embodiment, the optical amplifiers 40 comprise discrete amplifiers 42 and distributed amplifiers 44. The discrete amplifiers 42 comprise rare earth doped fiber amplifiers, such as erbium doped fiber amplifiers (EDFAs), and other suitable amplifiers operable to amplify the WDM signal 26 at a point in the optical link 16.

The distributed amplifiers 44 amplify the WDM signal 26 along an extended length of the optical link 16. In one embodiment, the distributed amplifiers 44 comprise bi-directional distributed Raman amplifiers (DRA). Each bi-directional DRA 44 includes a forward, or co-pumping source laser 50 coupled to the optical link 16 at a beginning of the amplifier 44 and a backward, or counter-pumping source laser 52 coupled to the optical link 16 at an end of the amplifier 44. It will be understood that the co-pumping and counter-pumping source lasers 50 and 52 may amplify disparate or only partially overlapping lengths of the optical link 16. The source lasers 50 and 52 may have the same, similar or disparate pump wavelengths and powers.

The Raman pump sources 50 and 52 comprise semiconductor or other suitable lasers capable of generating a pump light, or amplification signal, capable of amplifying the WDM signal 26 including one, more or all of the included optical information signals 24. The pump sources 50 and 52 may be depolarized, polarization scrambled or polarization multiplexed to minimize polarization sensitivity of Raman gain.

The amplification signal from the co-pumping laser 52 is launched in the direction of travel of the WDM signal 26 and thus co-propagated with the WDM signal 26 at a specified velocity mismatch. Forward pumping amplification has a low saturation level compared to backward pumping because the signal amplification takes place in the beginning of the fiber where the signal power is not yet attenuated due to linear loss. As a result, the forward-pumped Raman gain may start saturating at a low power signal level of about 0 dB/m and saturation power may decrease drastically with increasing pump power. The amplification signal from the counter-pumping laser 52 is launched in a direction of travel opposite that of the WDM signal 26 and thus is counter-propagated with respect to the WDM signal 26. The amplification signals may travel in opposite directions simultaneously at the same or other suitable speed.

The amplification signals comprise one or more high power lights or waves at a lower wavelength than the signal or signals to be amplified. As the amplification signal travels in the optical link 16, it scatters off atoms in the link 16, loses some energy to the atoms and continues with the same wavelength as the amplified signal or signals. In this way, Raman amplification is provided by the amplified signal acquiring energy over many miles or kilometers in that it is represented by more photons. For the WDM signal 26, the co-pumping and counter-pumping lasers 50 and 52 may each comprise several different pump wavelengths that are used together to amplify each of the distinct wavelengths of the optical information signals 24.

The optical communication system 10 may be designed, implemented, provisioned and/or operated to limit or minimize gain modulation and/or signal distortion of the optical information signals 24 due to forward pumping Raman amplification. The optical information signals may be intensity or otherwise suitably modulated. For intensity modulation, the carrier signal is modulated into two states, a high value and a low value based on the data signal. As used herein, high value means the modulation state representing a one (1) bit and low value means the modulation state representing a zero (bit). The low value typically equates to a nominal, but non-zero, amplitude, often referred to as "leakage light." The ratio between the high value and the low value is often referred to as the "extinction ratio." Gain modulation of the optical information signals may cause inter-symbol interference (ISI) and cross-talk between channels.

Inter-symbol interference may occur by the combined effect of pattern dependent pump depletion and pump signal walk-off caused by the interaction of the signals 24 and the forward pump signal. Pattern dependent pump depletion occurs when, after some kilometers of interaction the pump signal begins to adopt the modulation of the data signal. The pump signal experiences minor depletion when the data signal is in the zero state (due to the leakage light) and more significant depletion when the data signal is in the high state, due to the increased gain requirement of the high state. This effect may also be described as "self-gain modulation." The high and low state bits achieve different gain, however, thereby degrading the extinction ratio of the data signal and resulting in pulse broadening and degraded signal quality. Signal quality degrades even further when there is a slight velocity mismatch between the pump signal and the data signal.

When there is a slight mismatch between the velocities of the data signal and the pump signal, the pattern imprinted on the pump signal no longer corresponds exactly to the modulation states of the data signal. As the pump signal and data signal patterns separate due to different propagation velocities, known as "walk-off," the pump signal depletion pattern begins to imprint back on the data signal, causing inter-symbol interference (ISI). Walk-off may be quantified as ratio of the product of the differential group delay (between the pump signal and the data signal) and the effective interaction length of the gain medium, to the symbol period of the data signal.

Cross-talk between channels may occur by the combined effect of each channels contribution to the bit pattern pump depletion effect. As multiple channels propagate with the pump signal, the pump signal experiences pattern dependent pump depletion based on the combined gain requirements of each of the data signals. As a result, the pump signal power available to any of the data signals individually is dependent on the pump signal pattern caused by the effect of all data signals together. Thus, after some kilometers of interaction between the data signals and the pump signal, each data signal begins to accumulate pattern impressions caused by the pattern dependent pump depletion. The pattern impressions, known as "inter-channel crosstalk," or "cross-gain modulation" may cause signal quality degradation in each data signal.

Combined, the effects of inter-channel crosstalk, inter-symbol interference, and degraded extinction ratio result in a reduction of the data eye opening of the system. As used herein, data eye opening refers to the calculated difference between high and low states of superimposed, simultaneous data signals. The reduction, or penalty, of the eye opening depends on the modulation format of the data signal, the symbol rate of the data signal, the number of other data signals transmitted through the amplifier, the chromatic dispersion characteristics of the gain medium, the effective length of the gain medium, the wavelengths of the pump signal, wavelength of the data signal, power of the pump signal, and power of the data signal. The waveform distortion may become more serious when the number of WDM channels is smaller, the symbol rate of a WDM channel is lower, group velocities at a WDM channel wavelength and forward pump wavelengths in the gain medium are closer, launched optical power of the signal is larger and/or launched optical power of the forward pump is larger.

In one embodiment, gain modulation may be controlled by modulating a non-intensity characteristic of a carrier signal with the data signal at each optical sender 20. The non-intensity characteristic comprises phase, frequency or other suitable characteristic with no or limited susceptibility to cross talk due to cross-gain modulation (XGM) from a forward pumping distributed amplifier or a bi-directional pumping distributed amplifier. The non-intensity modulated optical information signal may be further and/or remodulated with a clock or other non-data signal using an intensity modulator. Thus, the non-intensity modulated optical information signal may comprise intensity modulation by a non-data signal.

In a particular embodiment, the WDM signal 26 comprises phase or frequency modulated optical information signals 24 which are amplified using the bi-directional DRAs 44 with no cross-talk between the channels 24 due to XGM. In this embodiment, the bi-directional DRAs 44 may provide amplification at a superior optical signal-to-noise ratio and thus enable longer transmission distances and improved transmission performance.

In another embodiment, the symbol period, gain medium, pump power and/or signal power may be specified to insure a threshold walk-off for any channel. In this embodiment, the effective interaction length ($L_{eff}$) of the gain medium is calculated. $L_{eff}$ may be calculated as:

$$(1-e^{-\alpha L})/\alpha$$

where $\alpha$ is the loss coefficient of the gain medium (calculated at the pump signal wavelength or the data signal wavelength, using the larger of the two), and L is the length of the gain medium. In designing new optical communication systems or amplifiers and/or upgrading existing systems, the gain medium may be selected so as to maximize $L_{eff}$. Also in this embodiment, the differential group delay $\Delta\beta$, for each data signal wavelength is calculated. $\Delta\beta$ may be calculated as:

$$\Delta\beta = \int_{\lambda_s}^{\lambda_p} D(\lambda)d\lambda$$

where $D(\lambda)$ is the chromatic dispersion of the gain medium, $\lambda_s$ is the data signal wavelength, and $\lambda_p$ is the pump signal wavelength. Based on these system parameters, the expected forward pumping bit walk-off, $N_w$, for each or any signal wavelength may be calculated. $N_w$ may be expressed as:

$$|\Delta\beta|L_{eff}/T_B$$

where $T_B$ is the symbol period of the data signal. Once the expected or desired forward pumping bit walk-off is known, the symbol period, gain medium, pump power and/or signal power may be specified to insure a threshold walk-off for any channel. When the walk-off is significantly large, the contribution of each individual bit to the depletion of instantaneous pump intensity becomes smaller and the resultant Raman gain that each signal bit experiences are averaged leading to a reduction in ISI. Walk-off may be otherwise quantified on the order of hundreds of bits over the Raman interaction length in the fiber. If the desired threshold walk-off is five, the symbol period, gain medium, pump power and/or signal power may be specified to meet the following condition:

$$|\Delta\beta|L_{eff} > 5T_B$$

Figure 2:
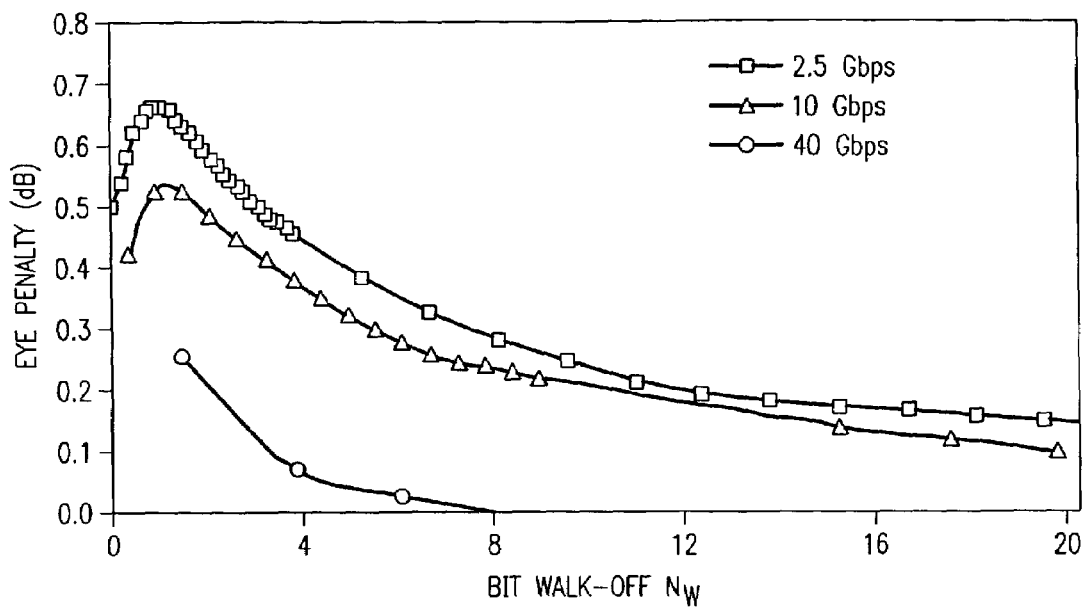
FIG. 2 illustrates performance characteristics of an optical communication system of FIG. 1, in accordance with several operating embodiments of the present invention.

FIG. 2 illustrates exemplary performance characteristics of an optical communication system 10 in accordance with several operating embodiments of the present invention. In particular, performance of the optical communication system 10 at 40, 10, and 2.5 Gbps at various walk-off rates is illustrated. In this embodiment, the optical communication system 10 includes signal wavelengths of 1550 and 1548.6 nm, a pump wavelength of 1450 nm, a fiber dispersion at 1550 nm of 4.4 ps/nm/km, a fiber loss of 0.2 dB/km and a fiber core area of 55 $\mu m^2$. As illustrated, when the expected bit walk-off is sufficiently large, the contribution of each individual bit to the depletion of instantaneous pump intensity becomes smaller, and the resultant Raman gain that each signal bit experiences are averaged, leading to reduced ISI.

Alternatively, if the optical communication system 10 is not designed to ensure a threshold bit walk-off for each channel, channel assignments may be based on the expected bit walk-off for each channel. For example, channels may be assigned in descending order, beginning with the channels that are associated with the highest effective bit walk-off rate. Alternatively, channels may be assigned according to a threshold bit walk-off, for example, channels with a bit walk-off higher than five may be assigned first. As the number of channels is increased, the effect of inter-channel cross-talk enjoys additional averaging so that the eye penalty is decreased by adding more channels.

Figure 3:
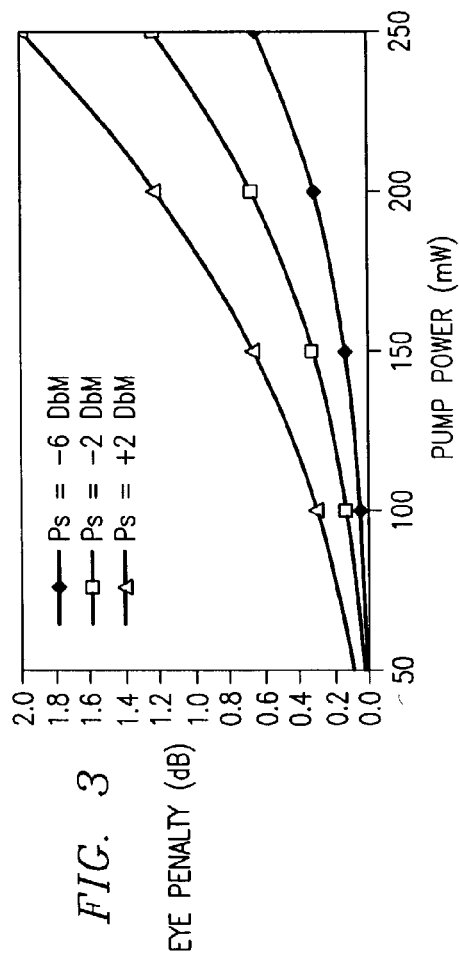
FIG. 3 illustrates performance characteristics of an optical communication system of FIG. 1, in accordance with several operating embodiments of the present invention.

In another embodiment, the optical communication system may be provisioned based on the signal power and pump power of signals in the system. FIG. 3 illustrates the eye penalty caused by gain modulation associated with various pump and signal powers ($P_S$). The gain medium may be selected based on the effective core area of the fiber, attenuation coefficients of the fiber, and/or the Raman gain spectrum of the fiber at the desired pump power and/or signal powers. Alternatively, the pump power and or signal powers may be based on the selected gain medium, so that no gain compression higher than, for example, one decibel (dB) is achieved.

In another embodiment, the pump and signal wavelengths may be selected so as to avoid a zero-dispersion wavelength between the pump and signal wavelengths. Thus, the system will have a differential group delay greater than zero, thereby increasing the expected walk-off experienced in the system.

By taking at least one of the measures described above, averaging of gain modulation takes place to mitigate the waveform distortion and/or degradation. In one embodiment, significant waveform degradation may be prevented. This may enable longer transmission distance or larger capacity in optical transmission systems. In addition, one or more of the above embodiments may be separately used and/or combined to further reduce signal degradation associated with gain modulation. For example, optical communication system 10 may be provisioned and/or operated to ensure that no channel experiences a bit walk-off less than five, and no zero-dispersion wavelength exists between the pump and signal wavelengths. In one embodiment, the walk-off is increased between pump and signal to a value where the eye penalty due to cross-gain modulation and ISI is negligible. Alternatively, the system 10 may be provisioned and/or operated so that no channel experiences a bit walk-off less than five, and channels are assigned in descending order, beginning with the channels having the highest bit walk-off. Other suitable combinations may be used.

Figure 4:
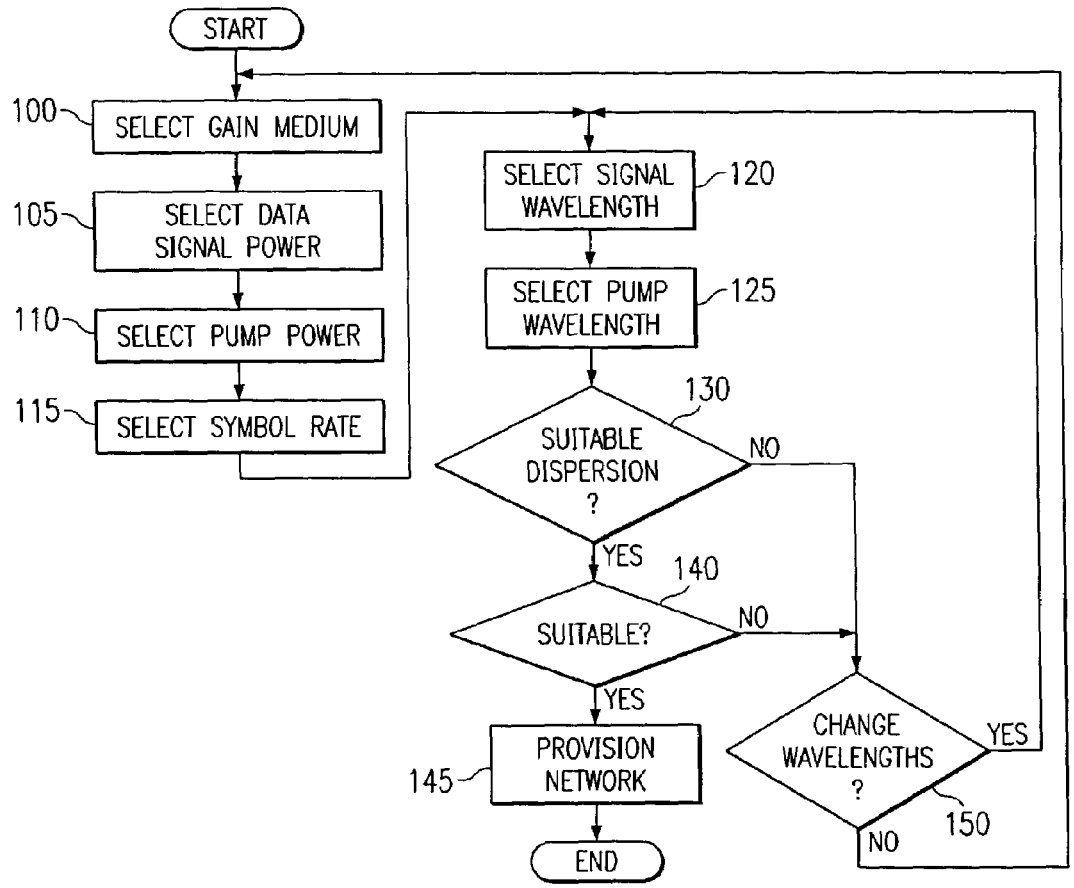
FIG. 4 is a flow diagram illustrating a method for provisioning an optical communication system in accordance with one embodiment of the present invention.

FIG. 4 illustrates a method of provisioning an optical network in accordance with one embodiment of the present invention. In a design phase of provisioning an optical network, a computer may be used to select parameters or provide alternatives based on programmed logic to meet the conditions of one or more of the embodiments described above and thus provide forward pumping Raman amplification while maintaining limited signal degradation. Thus, a design module may comprise logic embedded in media. The logic comprises functional instructions for carrying out programmed tasks. The media comprises computer disks or other suitable computer-readable media, application specific integrated circuits (ASIC), field programmable gate arrays (FPGA), digital signal processors (DSP), or other suitable specific or general purpose processors, transmission media, or other suitable media in which logic may be encoded and utilized. A computer or computers may also be used in operation of the system 10 to maintain parameters or limits.

Referring to FIG. 4, the method begins at step 100, wherein a gain medium is selected. The gain medium may be selected to provide a particular cost, effective length, effective core area, attenuation coefficient, and/or Raman gain spectrum in order to minimize gain modulation in the network.

Next, at step 105, a data signal power is selected. The data signal power may be based on the attenuation coefficient and/or saturation characteristics of the gain medium at the selected data signal power in order to minimize gain modulation in the network.

Next, at step 110, a pump power is selected. The pump power may be based on the attenuation coefficient and/or saturation characteristics of the gain medium at the selected data signal power and pump power in order to minimize gain modulation in the network. Moreover, the pump power may be selected to ensure that the network experiences a gain compression of less than one decibel, given the selected gain medium and data signal power.

Next, at step 115, a symbol rate is selected for the data signals. The symbol rate may be based on performance requirements, bit-rate requirements, desired modulation format, or otherwise suitably determined.

At step 120, a signal wavelength or band of wavelengths is selected. The signal wavelengths may be selected based on the selected gain medium, signal power, pump power, desired transmission characteristics or otherwise suitably selected. For example, the signal wavelength may be selected in order to ensure a threshold bit walk-off for each channel based on the selected gain medium, signal power, and pump power.

Next, at step 125, a pump wavelength is selected. The pump wavelength may be selected based on the selected gain medium, signal power, pump power, signal wavelengths, desired Raman amplification characteristics or otherwise suitably selected. For example, the pump wavelength may be selected in order to ensure a threshold bit walk-off based on the selected gain medium, signal power, pump power, and signal wavelength.

Next, at decisional step 130, a determination is made whether the selected signal and pump wavelengths possess suitable chromatic dispersion characteristics. In one embodiment, suitable chromatic dispersion characteristics include the absence of a zero-dispersion wavelength situated between the signal and pump wavelengths. Alternatively, suitable chromatic dispersion characteristics include a positive delay group differential for the signal and pump wavelengths given the selected gain medium, signal power, and pump power.

If the chromatic dispersion characteristics are not suitable, the process continues along the No branch of step 130 to decisional step 150. At decisional step 150, a determination is made whether to change the pump and signal wavelengths. If the pump and signal wavelengths are to be changed, the process proceeds along the Yes branch of step 150 to step 120, wherein a new signal wavelength is selected. If the pump and signal wavelengths are not to be changed, the process continues along the No branch of step 150 to step 100, wherein a new gain medium is selected and the process is restarted.

If, at step 130, the chromatic dispersion characteristics are suitable, the process continues along the Yes branch to step 140. At step 140, a determination is made whether the selected parameters will result in a suitable network. Suitability may be determined by a threshold bit walk-off required for each channel, a required number of channels having a threshold bit walk-off, a maximum gain compression, a combination of one or more of the above, or otherwise suitably determined based on the needs of the network.

For example, in one embodiment, the selected parameters are suitable if each data channel experiences at least a minimum bit walk-off. For example, the symbol rate may be suitable if it is less than one-fifth of the product of the differential group delay and the effective length of the gain medium (resulting in a bit walk-off of at least five). Alternatively, the symbol rate may be suitable if it results in at least a minimum number of channels experiencing a threshold bit walk-off.

If the selected parameters are not suitable, the process continues along the No branch of step 150 to decisional step 150, where, as previously described, a determination is made whether to change signal and/or pump wavelengths. If the selected parameters are suitable, the process continues along the Yes branch of step 140 to step 145. At step 145, the network is provisioned according to the selected gain medium, data signal power, pump power, signal wavelength, pump wavelength, and symbol rate, and the process ends. Provisioning may include selection and testing of parameters as well as the implementation, adjustment and/or operation of the network in accordance with the parameters. Thus, the signal wavelength may be selected first to operate in a designated band and the pump wavelength may be next selected to optimize Raman amplification. For example, in a particular embodiment, an about 1430 nanometer Raman pump and an about 1470 nanometer Raman pump may together cover the C band range of about 1530 to 1565 nanometers.

Although the method of FIG. 4 has been shown with specific steps in a specific order, it will be understood that the steps may be performed in a different order as appropriate, and other steps may be added or omitted as appropriate in keeping with the spirit of the present invention.

Although the present invention has been described with several embodiments, various changes and modifications may be suggested to one skilled in the art. It is intended that the present invention encompass such changes and modifications as fall within the scope of the appended claims.

What is claimed is:

1. An optical communication system, comprising:
   a plurality of nodes coupled by an optical fiber;
   the optical fiber comprising a gain medium and operable to transmit optical data signals in a plurality of channels;
   an optical pump coupled to the optical fiber, operable to generate and transmit an optical pump signal co-propagating with the data signals; and
   wherein the operating parameters of the optical communication system are determined to ensure that $|\Delta\beta|L_{eff} > N_w T_B$, wherein:
   $\Delta\beta$ is a differential group delay and is calculated as $\Delta\beta = \int^{\lambda_s, \lambda_p} D(\lambda) \, d\lambda$, wherein $D(\lambda)$ is a chromatic dispersion of the gain medium, $\lambda_s$ is a wavelength of the data signal, and $\lambda_p$ is a wavelength of the pump signal;
   $L_{eff}$ is calculated as $(1-e^{-\alpha L})/\alpha$, wherein $\alpha$ is a loss coefficient of the gain medium and L is a length of the gain medium;
   $N_W$ is a forward pumping bit walk-off; and
   $T_B$ is a symbol period of the data signal.

2. The system of claim 1, wherein $N_W$ is at least five.

3. A method for operating an optical network employing forward pumping distributed Raman amplification, comprising:
   determining a bit walk-off for a plurality of optical channels;
   assigning a set of optical signals to a sub-set of the plurality of optical channels having a highest bit walk-off relative to a co-propagating Raman amplification signal in the optical network; and
   operating an optical pump signal at a power operable to maintain a gain compression level for the optical signals below one decibel.

4. The method of claim 3, further comprising operating an optical pump signal at a wavelength operable to maintain a bit walk-off of at least five for each optical channel.

5. The method of claim 3, further comprising operating the optical channels at wavelengths operable to maintain a bit walk-off of at least five.

6. A method for provisioning an optical network using forward pumping Raman amplification, comprising:
   selecting at least one operating parameter for the optical network from a set of operating parameters that includes a gain medium, a signal power, a pump power of a co-propagating Raman amplification signal, a signal wavelength, a pump wavelength of the co-propagating Raman amplification signal and a symbol rate;
   determining the selected operating parameter based on the remaining operating parameters in the set of operating parameters to achieve at least one of a walk-off of the signal relative to the pump signal of at least 5 and a gain compression of the signal less than one decibel; and
   operating the network at the operating parameters.

7. The method of claim 6, wherein a pump power is determined based on the remaining parameters in the set of operating parameters.

8. The method of claim 6, wherein a data signal power is determined based on the remaining parameters in the set of operating parameters.

9. The method of claim 6, wherein a signal wavelength is determined based on the remaining parameters in the set of operating parameters.

10. The method of claim 6, wherein a symbol rate is determined based on the remaining parameters in the set of operating parameters.

* * * * *

UNITED STATES PATENT AND TRADEMARK OFFICE
CERTIFICATE OF CORRECTION

PATENT NO. : 7,110,680 B2  Page 1 of 1
APPLICATION NO. : 10/194016
DATED : September 19, 2006
INVENTOR(S) : Takeshi Hoshida et al.

It is certified that error appears in the above-identified patent and that said Letters Patent is hereby corrected as shown below:

Column 1, Line 14, Claim 1, delete "$\Delta\beta = \int^{\lambda s \lambda p} D(\lambda) d\lambda,$" and insert -- $\Delta\beta = \int_{\lambda s}^{\lambda p} D(\lambda) d\lambda,$ --.

Signed and Sealed this

Nineteenth Day of August, 2008

JON W. DUDAS
*Director of the United States Patent and Trademark Office*